United States Patent [19]
Brown

[11] 3,935,360
[45] Jan. 27, 1976

[54] COMPOSITE PAD
[75] Inventor: Erik Brown, Amherst, N.H.
[73] Assignee: Brown Products, Inc., Amherst, N.H.
[22] Filed: Jan. 28, 1974
[21] Appl. No.: 436,837

Related U.S. Application Data
[63] Continuation-in-part of Ser. No. 292,774, Sept. 27, 1972, abandoned.

[52] U.S. Cl. .............. 428/186; 156/210; 156/250; 428/184; 428/192
[51] Int. Cl.² .................. B32B 3/00; B32B 3/28
[58] Field of Search .......... 161/125, 133, 134, 135, 161/132; 156/210, 250, 251; 428/184, 186, 192

[56] References Cited
UNITED STATES PATENTS
1,189,518  7/1916  Wood .................................. 161/135
2,434,892  1/1948  Ulm ................................... 161/135

FOREIGN PATENTS OR APPLICATIONS
1,156,633  10/1963  Germany ........................... 161/137
27,793    12/1907  United Kingdom ................. 161/133
161,099   11/1952  Australia ........................... 161/133

Primary Examiner—George F. Lesmes
Assistant Examiner—Paul J. Thibodeau
Attorney, Agent, or Firm—Kenway & Jenney

[57] ABSTRACT

A unitary composite corrugated board structure of a double layer of single-faced corrugated board is fabricated by assembling the boards with their corrugated faces in nesting contact and then compressively cutting the layers by applying a force in a direction substantially perpendicular to the surface of the planar lining sheet of the board. The cutting operation crushes the corrugations at the cut edge into interlocking reentrant configurations which hold the boards together without the need for an adhesive.

1 Claim, 4 Drawing Figures

COMPOSITE PAD

REFERENCE TO RELATED APPLICATIONS

This application is a continuation-in-part of application Ser. No. 292,774, filed Sept. 27, 1972, now abandoned.

BACKGROUND OF THE INVENTION

This invention relates generally to corrugated paperboard structures and a method for producing the same.

Corrugated paperboards or, as commonly referred to in the industry, "corrugated boards" are used to provide a protective covering for articles in transit or as containers for storing articles, particularly articles of an amorphous shape. In order to achieve maximum crush resistance with minimum weight and volume of material, the prior art teaches nesting and uniting of corrugated boards by means of an adhesive, as in Swift U.S. Pat. No. 1,032,789 or Wells et al. U.S. Pat. No. 3,292,107. That technique requires the use of a suitable adhesive component, an apparatus for applying that component to the corrugations, and an apparatus for retaining the corrugated panels in adhering relation until the adhesive sets. Further, the application and setting of the adhesive is time consuming.

An object of this invention is to provide a fast and economical method for fabricating composite structures of corrugated boards without the use of an adhesive and associated machinery and without decreasing the crush resistant quality of the structures.

SUMMARY OF THE INVENTION

The present invention provides a corrugated board structure formed from two single-faced corrugated boards contacted so that the corrugations of one board rest upon the corrugations of the other board and wherein the corrugations are in a re-entrant configuration at or adjacent to the portion of the perimeter of the structure having the open surfaces of the corrugations exposed to view. The corrugated boards are maintained in contact with each other due to the re-entrant configuration of the corrugations and without the need for an adhesive.

The corrugated board structures of this invention are formed by first placing the corrugations in a nesting relationship and subsequently subjecting the corrugations to a compressive force in a direction substantially perpendicular to the surface of the planar lining sheet of the corrugated boards. The compressive force is applied at or near the ends of the edges of the nested boards so as to minimize the length of noncompressed corrugation between the edge of the structure and the compressed corrugations. By minimizing this length, the chance of subsequent separation of the boards by the application of a force at the edge is minimized. In a preferred aspect of the invention, the compression of the nested corrugated boards is effected while cutting the structure to the desired shape with a knife edge that is applied to the nested structure in a direction substantially perpendicular to the surface of the planar lining sheet of a corrugated board.

DESCRIPTION OF SPECIFIC EMBODIMENTS

By eliminating the need for adhesive to maintain the corrugated boards in contact, the present invention achieves the aforesaid economies in time and machinery without reduction of the ability of the corrugated structure to resist crush. The method for producing the composite structure of the present invention may be conveniently divided into two operations. First, two single-faced corrugated boards are brought into contact so that the corrugations of one board nest upon the corrugations of the other board. The nesting contact is achieved without the use of adhesive. Secondly, the nested boards are compressed by the application of a force in a direction substantially perpendicular to the surface of the planar lining sheet of a corrugated board. This force results in an inelastic deformation of the corrugations of the nested boards. The deformation is restricted to a finite area immediate to the freshly cut perimeter of the pad. In this manner, a composite structure of the desired shape and strength is fabricated.

A novel result of compressively cutting the nested boards is that the boards remain in nested contact after the cutting has been completed despite the absence of adhesive between the boards. This desirable result is due to the nature of the cutting operation and the physical characteristics of the corrugated boards. This method and product are in contrast to the teachings of the Swift and Wells patents previously referred to, which patents depend upon the use of an adhesive to secure corrugated boards in contact.

Surprisingly, it has been found that the desired reentrant configuration of the compressed corrugated board can be attained only when the compressive force is applied in a direction substantially perpendicular to the surface of the planar lining sheet of a corrugated board. For example, when the nested corrugated board is to be cut to the desired shape, a rotating blade that cooperates with an anvil cannot be employed since the corrugations merely are bent in a direction opposite the direction of movement of the nested boards into the nip formed by the rotating knife and the anvil without formation of the desired reentrant configuration. Similar undesirable results are encountered when the nested board is passed into the nip formed by two knives in face-to-face relationship which exert a shearing cutting force at the nip. The resultant structure has an irregular edge with the corrugations not being in a re-entrant configuration. In practicing the present invention, the desired compression force can be applied easily by means of a flat knife edge which cuts through the nested board in a direction substantially perpendicular to the surface of a planar lining sheet. When it is desired not to cut the nested board while applying the desired compression force, the distance of the knife edge from the surface supporting the nested board can be adjusted so that the desired compression occurs without severing the board. It is desirable to operate in this manner when the edge nearest the re-entrant corrugated configuration has been previously cut to the desired size and shape.

This invention is particularly useful in forming box blanks or corner pad blanks which are foldable into box structures or corner pad structures.

A composite pad of the present invention comprises two single-faced corrugated boards. Each corrugated board comprises a planar lining sheet, adhesive, and a corrugated member.

Figure 1:
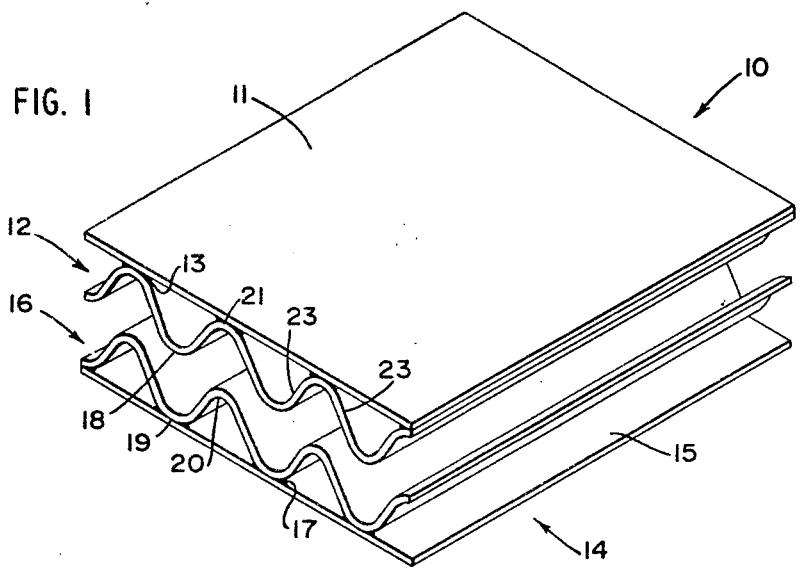
FIG. 1 is a perspective view of two single-faced corrugated boards about to be brought into nested contact to ultimately form a composite pad of desired form.

Referring to FIG. 1, a top corrugated board 10 comprises planar lining sheet 11 and corrugated member 12. Adhesive 13 maintains the member and sheet in adhesive contact. Similarly, base corrugated board 14 comprises planar lining sheet 15, corrugated member 16 and adhesive 17.

The boards are brought into nested contact so that the corrugation crests 18 of board 10 rest upon the corrugation troughs 19 of board 14, and the corrugation crests 20 of board 14 support the corrugation troughs 21 of board 10.

Figure 2:
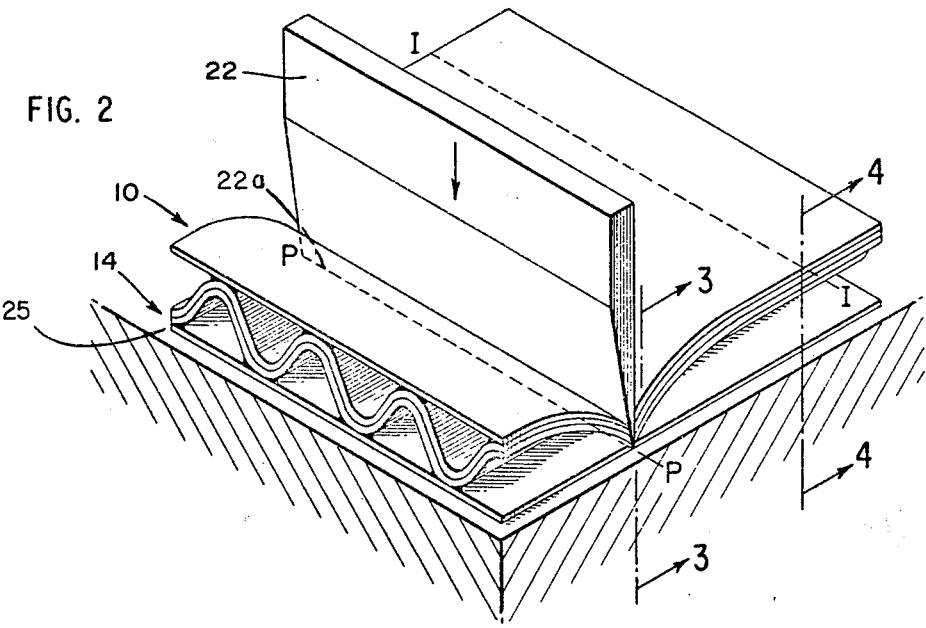
FIG. 2 is a perspective view of a tool compressively cutting the nested boards of FIG. 1.

Referring to FIG. 2, cutting tool 22 severs boards 10 and 14 along the pre-selected path P—P, producing the composite pad of the desired shape. When it is desired to compress the nested boards 10 and 14 without cutting them, the distance between the knife edge 22a and the supporting surface 25 can be adjusted accordingly.

Figure 3:
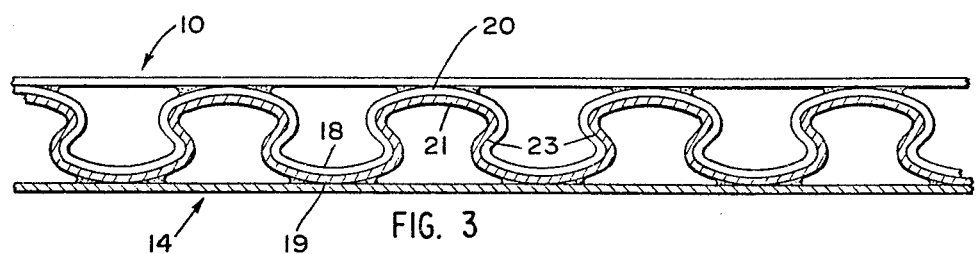
FIG. 3 is a cross-sectional view of the boards of FIG. 2 taken along lines 3—3, after the compressive cutting operation has ended.

As the cutting tool severs the boards 10 and 14, it exerts a compressive force sufficient to inelastically deform the corrugations along the cut path P—P into an interlocking Re-entrant configuration illustrated in FIG. 3. A die cutter may be used to apply sufficient compressive force to achieve the desired re-entrant configuration. In this manner the boards 10 and 14 are permanently interlocked to form the desired composite pad. In particular, the corrugation crests 18 and 20 and corrugation troughs 19 and 21 broaden under the compressive force of the cutting tool. The broadening of the crests and troughs is accompanied by a shifting of the corrugation walls 23 as will be noted upon comparison of FIGS. 1 and 3. These effects result in an interleaving network of cells. The inner walls of one cell consist of the broadened corrugations of the top board 10; the inner walls of the adjacent cell consist of the broadened corrugations of the base board 14. This composition is repeated throughout the configuration.

Figure 4:
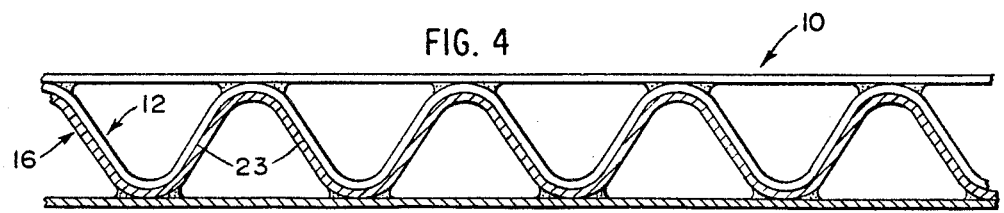
FIG. 4 is a cross-sectional view of the boards of FIG. 2 taken along lines 4—4, after the compressive cutting operation has ended.

However, the inner corrugations of the pad are not deformed by the compressive force exerted along the cutting path P—P. These corrugations retain their wave-like shape while in nested contact. Consequently, the composite pad retains the undiminished ability to resist crush. FIG. 4 shows unmodified corrugations 12 and 16 in nested contact along an inner path I—I of FIG. 3, which is sufficiently distant from cutting path P—P so that these corrugations are not deformed.

It will be recognized that various modifications in the method and product may be carried out in accord with generally recognized practices, and without departing from the teaching of this invention; for example, the composite pad may comprise several layers of nested corrugated boards rather than the single layer shown in the drawings, and the composite pads may be arranged in an arcuate shape in contrast to the planar construction displayed herein.

I claim:

1. A corrugated board structure defined by a perimeter comprising two corrugated boards each having a planar lining sheet adhered to a corrugated member wherein the corrugated members of each board are in nesting relationships, the corrugations being exposed to view at locations along said perimeter and closely adjacent said perimeter the corrugations being inelastically deformed into an interlocking re-entrant configuration, and not being deformed from their initial corrugated shape elsewhere whereby the structure retains its ability to resist crushing.

* * * * *